US008888268B2

(12) United States Patent
Aoki et al.

(10) Patent No.: US 8,888,268 B2
(45) Date of Patent: Nov. 18, 2014

(54) PRINTING METHOD AND TRANSPORT MEMBER

(75) Inventors: Satoshi Aoki, Ibaraki-ken (JP);
Yoshifumi Watanabe, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 321 days.

(21) Appl. No.: 13/588,714

(22) Filed: Aug. 17, 2012

(65) Prior Publication Data

US 2013/0050332 A1 Feb. 28, 2013

(30) Foreign Application Priority Data

Aug. 31, 2011 (JP) ................ P2011-188396

(51) Int. Cl.
| | | |
|---|---|---|
| B41J 2/015 | (2006.01) | |
| B41M 5/00 | (2006.01) | |
| B41J 2/21 | (2006.01) | |
| C09D 11/36 | (2014.01) | |
| B41J 11/00 | (2006.01) | |

(52) U.S. Cl.
CPC ............... B41M 5/00 (2013.01); B41J 2/2107 (2013.01); C09D 11/36 (2013.01); B41J 11/007 (2013.01)
USPC .............. 347/100; 347/101; 347/104; 347/95

(58) Field of Classification Search
CPC .......... B41J 2/01; B41J 2/0057; B41J 2/2107; B41J 11/00; B41J 11/30; B41J 11/36; B41J 11/007; B41J 11/0045; B41M 5/00
USPC .............................................. 347/20, 95–105
See application file for complete search history.

(56) References Cited

U.S. PATENT DOCUMENTS

| 7,401,913 | B2* | 7/2008 | Nishiberi et al. ............. 347/104 |
| 8,585,197 | B2* | 11/2013 | Aoki et al. .................... 347/100 |
| 8,746,868 | B2* | 6/2014 | Watanabe ..................... 347/100 |
| 2011/0315049 | A1* | 12/2011 | Aoki et al. ................. 106/31.86 |
| 2012/0120174 | A1* | 5/2012 | Hosoya et al. ............... 347/104 |
| 2012/0293581 | A1* | 11/2012 | Aoki et al. ..................... 347/20 |

FOREIGN PATENT DOCUMENTS

| JP | 2004-338234 | 12/2004 |
| JP | 2007-320714 | 12/2007 |

* cited by examiner

*Primary Examiner* — Matthew Luu
*Assistant Examiner* — Rut Patel
(74) *Attorney, Agent, or Firm* — Nath, Goldberg & Meyer; Jerald L. Meyer

(57) ABSTRACT

A printing method is provided, wherein the printing method including: printing an ink, having a total surface free energy $\gamma$ calculated from the Kaelble-Uy theoretical formula of 25 to 30 mN/m, and a dispersive component ratio $\gamma dr$ represented by a formula (1) shown below of 0.55 to 0.75, onto a recording medium, and transporting the recording medium using a transport member that opposes at least a printed surface of the printed recording medium, wherein the transport member has a total surface free energy $\gamma$ calculated from the Kaelble-Uy theoretical formula of 20 mN/m or less, and a dispersive component ratio $\gamma dr$ represented by the formula (1) shown below of 0.75 to 1.00: $\gamma dr = \gamma d/\gamma$ (1), wherein $\gamma dr$ represents the dispersive component ratio, $\gamma d$ represents a surface free energy of as dispersive component, and $\gamma$ represents the total surface free energy.

6 Claims, 1 Drawing Sheet

PRINTING METHOD AND TRANSPORT MEMBER

CROSS REFERENCE TO RELATED APPLICATIONS

This application is based upon and claims the benefit of priority from prior Japanese Patent Applications No. 2011-188396 filed on Aug. 31, 2011, the entire contents of which are incorporated by reference herein.

BACKGROUND OF THE INVENTION

1. Field of the Invention

The present invention relates to a printing method and a transport member.

2. Description of the Related Art

In inkjet printing methods, screen priming methods and offset printing methods and the like, following application and printing of an ink onto a recording medium, the recording medium is sometimes transported without first performing a fixing treatment or the like on the primed surface, with the ink in an undried state. In a paper ejection step performed immediately following printing, in those cases where the recording medium is transported by frictional contact using transport rollers or the like, there is a possibility that when a transport roller contacts the printed surface of the recording medium, the ink on the recording medium may adhere to the transport roller, and the ink adhered to the transport roller may then be transferred to another position on the same recording medium, or onto a following recording medium, generating so-called transfer staining.

Patent Document 1 proposes a printing apparatus which, in order to suppress the occurrence of staining caused by transfer of an ink to a rotating body used for transporting a primed paper, has a cleaning member which is pressed into contact with the outer peripheral surface of the rotating body to clean the ink adhered to the outer peripheral surface of the rotating body. However, problems arise in that installing a cleaning member has an associated cost, and also requires installation space inside the printing apparatus.

Patent Document 2 proposes a sheet-feeding roller device in which, during transport of a sheet on which an image has been formed, in order to prevent the uncured ink from adhering to a feed roller and the following sheet then being stained by the transfer of ink from the roller, a plurality of protections are formed on the outer peripheral surface of one of a pair of rollers, and a multitude of fine projections are formed on the outer peripheral surface of the other roller. However, when the rollers contact the sheet via these projections, there is a possibility that slipping may occur during sheet feeding, resulting in a delay in the sheet feed.

On the other hand, inks can be broadly classified into aqueous inks and non-aqueous inks. Non-aqueous inks are less likely to cause curling or cockling of the recording medium such as paper, thereby facilitating transport of the recording medium, and are therefore suited to high-speed printing. A non-aqueous ink is a penetration-drying type ink, meaning the ink itself does not dry and solidify, but rather penetrates into the recording medium such as paper and then dries. Because non-aqueous inks require a comparatively long time to dry, transfer staining tends to occur reasonably frequently when the recording, medium is transported by transport, rollers following printing. Further, in those cases where transport rollers made of resin are used, a problem arises in that the transport rollers may be attacked by the non-aqueous ink, causing a deterioration in the durability of the rollers.

[Patent Document 1] SP 2004-138234 A
[Patent Document 2] JP 2007-320714 A

An object of the present invention is to provide a printing method and a transport member which prevent transfer staining by the transport member and improve the ink resistance of the transport member.

SUMMARY OF THE INVENTION

A first aspect of the present invention provides a printing method that comprises printing an ink, having, a total surface free energy $\gamma$ calculated from the Kaelble-Uy theoretical formula of 25 to 30 mN/m, and a dispersive component ratio $\gamma dr$ represented by a formula (1) shown below of 0.55 to 0.75, onto a recording medium, and transporting the recording medium using a transport member that opposes at least the printed surface of the printed recording medium, wherein the transport member has a total surface free energy $\gamma$ calculated from the Kaelble-Uy theoretical formula of 20 mN/m or less, and a dispersive component ratio $\gamma dr$ represented by the formula (1) shown below of 0.75 to 1.00.

$$\gamma dr = \gamma d / \gamma \quad (1)$$

In the formula 1, $\gamma dr$ represents the dispersive component ratio, $\gamma d$ represents the surface free energy of the dispersive component, and $\gamma$ represents the total surface free energy.

Another aspect of the present invention provides a transport member used for transporting a recording medium on which an image has been pouted with an ink having a total surface free energy $\gamma$ calculated from the Kaelble-Uy theoretical formula of 25 to 30 mN/m, and a dispersive component ratio $\gamma dr$ represented by a formula (1) shown below of 0.55 to 0.75, wherein a portion of the transport member that opposes at least the printed surface of the recording medium has a total surface free energy $\gamma$ calculated from the Kaelble-Uy theoretical formula of 20 mN/m or less, and a dispersive component ratio $\gamma dr$ represented by the formula (1) shown below of 0.75 to 1.00.

$$\gamma dr = \gamma d / \gamma \quad (1)$$

In the formula 1, $\gamma dr$ represents the dispersive component ratio, $\gamma d$ represents the surface free energy of the dispersive component, and $\gamma$ represents the total surface free energy.

DETAILED DESCRIPTION OF THE EMBODIMENTS

Figure 1:
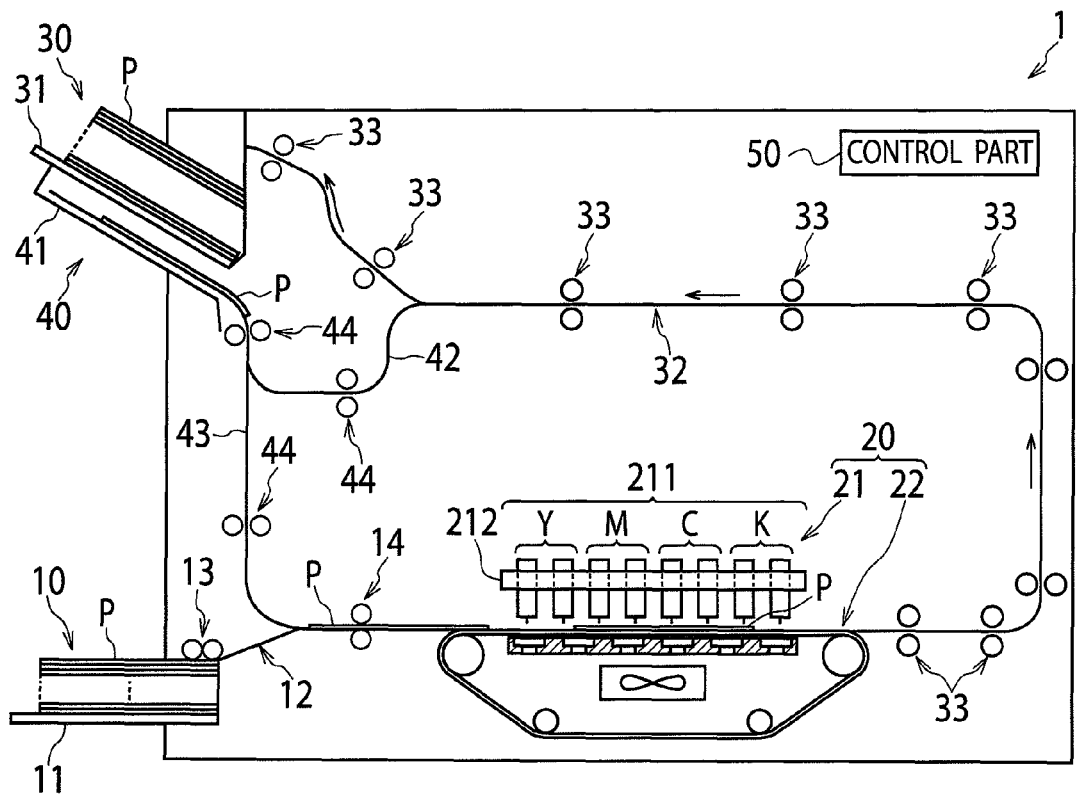
FIG. 1 is a schematic illustration of an inkjet printing apparatus equipped with transport rollers that represent an example of the transport member of an embodiment of the present invention.

A description of embodiments according to the present invention is presented below, but the examples within these embodiments in no way limit the scope of the present invention.

A printing method according to one embodiment of the present invention comprises printing an ink, having a total surface free energy $\gamma$ calculated from the Kaelble-Uy theoretical formula of 25 to 30 mN/m, and a dispersive component ratio γdr represented by a formula (1) shown below of 0.55 to 0.75, onto a recording medium, and transporting the recording medium using a transport member that opposes at least the printed surface of the printed recording medium, wherein the transport member has a total surface free energy γ calculated from the Kaelble-Uy theoretical formula of 20 mN/m or less, and a dispersive component ratio γdr represented by the formula (1) shown below of 0.75 to 1.00.

$$\gamma dr = \gamma d/\gamma \quad (1)$$

In the formula 1, γdr represents the dispersive component ratio, γd represents the surface free energy of the dispersive component, and γ represents the total surface free energy.

By using this method, transfer staining caused by the transport member can be prevented, and the ink resistance of the transport member can be improved. In other words, adhesion of the ink to the transport member can be prevented, thereby preventing staining of the recording medium caused by transfer of the ink from the transport member back onto another position on the same recording medium, or onto a subsequently transported recording medium. Further, the ink resistance of the transport member can be improved, meaning the durability of the transport member can be improved and the life of the transport member can be extended.

The total surface free energy γ is used as an evaluation indicator of the wettability. The Kaelble-Uy theoretical formula is a method of quantitatively determining the total surface free energy γ of a solid.

The Kaelble-Uy theoretical formula assumes that the total surface free energy γ is composed of a dispersive component γd and a polar component γp, and represents the total surface free energy γ using a formula 2 shown below.

$$\gamma = \gamma d + \gamma p \quad (2)$$

Further, if the surface enemy of the surface of a liquid is represented by γl, the surface energy of a solid is represented by γs, and a contact angle between the two is represented by θ, then a formula 3 shown below applies.

$$\gamma l(1+\cos\theta) = 2\sqrt{\gamma sd \gamma ld} + 2\sqrt{\gamma sp \gamma lp} \quad (3)$$

Accordingly, by using two liquids for which the γl component is known, measuring the contact angle θ for each of the liquids, and solving, the simultaneous equations relating to γsd and γsp, the value of γs can be determined.

In this manner, the total surface free energy γ and the dispersive component γd of the transport member can be calculated.

Similarly, by using the Kaelble-Uy theoretical formula, the total surface free energy γ and the dispersive component γd of the ink can be calculated. In the following description, the total surface free energy of the ink is represented by γx, the dispersive component is represented by γxd, and the polar component is represented by γxp.

The total surface free energy γx of the ink can be determined by measuring the surface tension of the ink and measuring the interfacial tension with the known solvent water, and then solving the resulting simultaneous equations.

The total surface free energy of water γw is represented by a formula 4 shown below.

$$\gamma w = \gamma wd + \gamma wp \quad (4)$$

Further, if the interfacial tension between the ink, and water is represented by γwx, then a formula 5 shown below applies.

$$\gamma wx = \gamma w + \gamma x - 2\sqrt{\gamma wd \gamma xd} - 2\sqrt{\gamma wp \gamma xp} \quad (5)$$

By measuring the interfacial tension γwx, and solving the binary quadratic equation for the conditions γxd≥0 and γxp≥0, the two components for the ink can be determined.

Measurement of the contact angle θ can be conducted using, the pendant drop method, and measurement of the surface tension and the interfacial tension can be conducted using the drop method. In both cases, measurement may be conducted using a dynamic contact angle meter DM500 manufactured by Kyowa Interface Science Co., Ltd.

By ensuring that the values for the total surface free energy and the dispersive component ratio for the ink and the transport member satisfy the respective ranges described above, the affinity between the ink and the transport member is low, and therefore the ink on the recording medium is unlikely to be transferred to the transport member, and transfer staining by the transport member can be prevented. If the values for the total surface energy and the dispersive component ratio for the ink and the transport member fall outside the respective ranges described above, then the affinity between the ink and the transport member increases, and there is an increased chance of transfer staining by the transport member. Even if the values for the total surface free energy and the dispersive component ratio for one of the ink and the transport member satisfy the respective ranges described above, if the other values fall outside the above ranges, then the affinity increases, and transfer staining by the transport member may occur.

The total surface energy γ of the transport, member may be any value of 20 mN/m or less, but is preferably 16 mN/m or less. Further the dispersive component ratio γdr of the transport member may be any value within a range from 0.75 to 1.00, but is preferably from 0.80 to 1.00, and more preferably from 0.85 to 1.00.

The contact angle between the ink and the transport member is preferably at least 50°, and more preferably 60° or higher. This ensures reduced affinity between the ink and the transport member, enabling adhesion of the ink to the transport member to be effectively prevented. Further, the ink resistance of the transport member can also be more effectively improved.

There are no particular limitations on the material for the portion of the transport member that opposes the printed surface, provided it has the physical properties described above, and examples include urethane resins, silicone resins, fluororesins, and ethylene-propylene diene resins. Among these, the use of a urethane resin and/or a silicone resin is preferred. These resins may be used individually, or in combinations of two or more resins.

Specific examples of commercially available products that may be used as the material for the portion of the transport member that opposes the printed surface include silicone resins such as Silicone Si5406Bk (manufactured by Kinjo Rubber Co., Ltd.), and urethane resins such as Special Urethane LMY-70 (manufactured by Kinjo Rubber Co., Ltd.), Special Urethane LMY-90 (manufactured by Kinjo Rubber Co., Ltd.), and Special Urethane 81X23G (manufactured by Kinyo Co., Ltd.).

The transport member may have a coefficient of friction of 0.3 to 0.8 and a hardness of 30° to 90° for the portion that opposes the printed surface. By ensuring values within these maces, the recording medium can be transported favorably by frictional contact.

The transport member may also use other arbitrary members, provided they have the physical properties described, above. Examples of arbitrary members which may be added, besides the resins described above, include POM (polyacetal), fluororesins and ethylene-propylene diene resins.

The transport member can be used as a transport roller, a conveyor belt, or a wall section of a transport path or the like. The transport roller may be either a single roller that makes frictional contact with one side of the recording medium to transport the recording medium, or a pair of rollers which are pressed together so that the recording medium is transported by being sandwiched between the nip portions. In terms of a conveyor belt, for example, an endless belt may be used.

In the transport member, at least the portion of the transport member that opposes the printed surface of the recording medium should have the physical properties described above. For example, transport members may be used in which the interior of the transport member is formed of another material, and a material having the above physical properties is applied as a surface layer portion, or a sheet of a material having the above physical properties is affixed to the other material. Further, a transport member in which the entire member is formed of a material having the above physical properties may also be used.

An inkjet printing apparatus equipped with transport rollers is described below, with reference to the drawings, as an example of a transport member of the present embodiment. FIG. 1 is a schematic illustration of an inkjet printing apparatus 1 of the present embodiment. The inkjet printing apparatus 1 comprises a paper feed unit 10, a printing unit 20, a paper ejection unit 30, an inversion unit 40, and a control unit 50.

The paper feed unit 10 supplies a paper P as a recording medium to the printing unit 20, and comprises a paper feed tray 11 that is provided near the bottom of one side of the inkjet printing apparatus 1 and stores an unprinted paper P, a paper feed path 12 that guides the paper P from the paper teed tray 11 to the printing unit 20, a paper teed roller pair 13 that extracts one sheet of the paper P at a time from the paper feed tray 11, and a timing roller pair 14 that feeds each sheet of the paper P into the printing min 20 at a predetermined timing.

The printing unit 20 receives the paper P from the paper feed unit 10, discharges and prints an ink onto the paper P, and then transports the paper P to the paper ejection unit 30. The printing unit 20 comprises a head unit 21 that discharges ink, and a platen unit 22 that transports the paper P beneath the head unit 21. The head unit 21 comprises a plurality of inkjet heads 211 (Y, M, C, K), and a head holder 212 that holds the inkjet heads 211.

The paper ejection unit 30 transports and ejects the printed paper P, and comprises a paper ejection tray 31 that is provided near the top of one side of the ink jet printing apparatus 1 and stores the printed paper P, a paper ejection path 32 that guides the printed paper P, with the printed surface facing downward, from the printing unit 20 to the paper ejection tray 31, and a plurality of paper ejection roller pairs 33 that eject one sheet of the paper P at a time from the paper ejection path 32.

The inversion unit 40 inverts the paper P that has been printed on one side, and feeds the paper P to the printing unit 20 for a second time with the unprinted surface facing upward. The inversion unit 40 comprises a buffer space 41 provided beneath the paper ejection tray 31, a branch path 42 which branches off the paper ejection path 32 and guides the paper P to the buffer space 41, a paper re-feed path 43 that guides the paper P from the buffer space 44 to the timing roller pair 14, and a plurality of inversion roller pairs 44 that feed one sheet of the paper P at a time along the branch path 42 and the paper re-feed path 43.

The control unit 50 controls the operations of each of the rums, and processes instructions received from a user via an operation panel not shown in the drawings.

Next is a description of the overall operation of the inkjet printing apparatus 1. An unprinted sheet of the paper P is extracted from the paper feed tray 11 onto the paper feed path 12 by the paper feed roller pair 13. The paper P on the paper feed path 12 is fed into the printing unit 20 at a predetermined timing by the timing roller pair 14.

In the printing unit 20, the platen unit 22 transports the paper P at a predetermined speed, while the head unit 21 discharges ink onto the paper P to perform printing. The primed paper is fed along the paper ejection path 32 one sheet at a time by the paper ejection roller pairs 33, and is ejected onto the paper ejection tray 31 with the printed surface facing downward.

Further, when performing double-sided printing, the paper P on the paper ejection path 32 is fed onto the branch path 42 and guided into the buffer space 41 by a path switching mechanism not shown in the drawing) that is provided partway along the paper ejection path 32. The paper P is then fed from the buffer space 41 to the paper re-feed path 43, passes through the timing roller pair 14 for a second time, and is resupplied to the printing unit 20.

In the inkjet punting apparatus described above, the transport member of the present embodiment can be used for the paper ejection roller pairs 33 and the inversion roller pairs 44 used for double-sided printing. Further, the transport member of the present embodiment may also be used as the wall sections or guides for the paper ejection path 32, the branch path 42 or the paper re-feed path 43. Furthermore, in preparation for double-sided printing, the transport member of the present embodiment may also be used for the timing roller pair 14.

Figure 2:
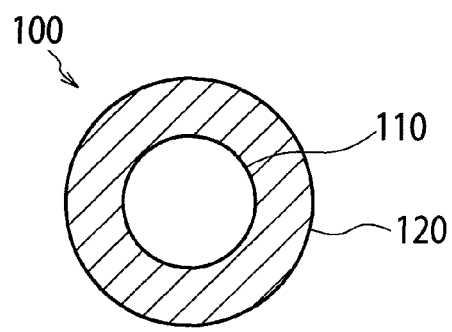
FIG. 2 is a schematic cross-sectional view of a transport roller 100 used as the paper ejection roller pairs 33 and inversion roller pairs 44 in FIG. 1.

FIG. 2 is a schematic cross-sectional view of a transport roller 100 that can be used as the paper ejection roller pairs 33 and the inversion roller pairs 44 illustrated in FIG. 1. The transport roller 100 comprises an axial portion 110 and a surface layer portion 120 that covers the surface of the axial portion 110. The surface layer portion 120 has the physical properties described above, whereas the axial portion 110 may be formed of a metal.

Examples of methods that may be used for producing the transport roller include lamination methods (methods in which a rubber sheet discharged from a calender is rolled and molded), extrusion methods (various molding methods that use an extruder), die molding methods (methods in which a rubber is used to fill a molding die, and heat and pressure are then applied using a press machine), and injection molding methods (methods in which a liquid resin is injected into a molding die, and the die is then heated in an oven), and any method may be used provided the desired physical properties are obtained.

There are no particular limitations on the ink of the present embodiment, provided it has the physical properties described, above, and a non-aqueous ink comprising a coloring material and a non-aqueous solvent, or a W/O emulsion ink in which the outer phase is an oil phase and the inner phase is a water phase can be used. The non-aqueous ink is described below.

There are no particular limitations on the coloring material, provided it can be dissolved or dispersed in the ink solvent, and either a dye or a pigment may be used. From the viewpoint of forming superior images, the coloring material preferably contains a pigment as the main component.

There are no particular limitations on the pigment, and any organic pigment or inorganic pigment that is used in the technical field of printing can be used. Specific examples of pigments that can be used favorably include carbon black, cadmium red, chrome yellow, cadmium yellow, chrome oxide, viridian, titanium cobalt green, ultramarine blue, Prussian blue, cobalt blue, azo-based pigments, phthalocyanine-based pigments, quinacridone-based pigments, isoindolinone-based pigments, dioxazine-based pigments, threne-based pigments, perylene-based pigments, thioindigo-based pigments, quinophthalone-based pigments and metal complex pigments. These pigments may be used individually, or two or more pigments may be used in combination.

From the viewpoints of discharge stability and storage stability, the average particle size of the pigment is preferably not more than 300 nm, more preferably not more than 150 nm, and still more preferably 100 nm or less. In this description, the average particle size of the pigment can be measured using a dynamic light-scattering particle size distribution measurement apparatus LB-500 (manufactured by Horiba, Ltd.) or the like.

The amount of the pigment within the ink is typically within a range from 0.01 to 20% by weight, and from the viewpoints of print density and ink viscosity, is preferably from 1 to 15% by weight, and more preferably from 5 to 10% by weight.

In those cases where a pigment is used as the coloring material, a pigment dispersant is preferably added to the non-aqueous ink to improve the dispersion of the pigment within the non-aqueous ink. There are no particular limitations on the pigment dispersant, provided it is able to stably disperse the pigment within the solvent, and examples include hydroxyl group-containing carboxylic acid esters, salts of long-chain polyamine and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyetherester anionic surfactants, naphthalenesulfonic acid formalin condensate salts, polyoxyethylene alkyl phosphate esters, polyoxyethylene nonylphenyl ethers, polyester polyamines and stearylamine acetate, and of these, the use of a polymer dispersant is particularly desirable.

Specific examples of the pigment dispersant include Solsperse 5000 (a phthalocyanine ammonium salt-based dispersant), 13940 (a polyester amine-based dispersant), 17000 and 18000 (aliphatic amine-based dispersants), and 11200, 22000, 24000 and 28000 (all product names) manufactured by Lubrizol Japan Ltd., Efka 400, 401, 402, 403, 450, 451 and 453 (modified polyacrylates), and 46, 47, 48, 49, 4010 and 4055 (modified polyurethanes) (all product names) manufactured by Efka Chemicals BV, Demol P and EP, Poiz 520, 521 and 530, and Homogenol L-18 (polycarboxylate polymeric surfactants) (all product names) manufactured by Kao Corporation, Disparlon KS-860 and KS-873N4 (high-molecular weight polyester amine salts) (all product names) manufactured by Kusumoto Chemicals, Ltd., and Discol 202, 206, OA-202 and OA-600 (multi-chain polymeric nonionic dispersants) (all product names) manufactured by Dai-ichi Kogyo Seiyaku Co, Ltd.

Of the above pigment dispersants, a polyamide-based dispersant that has a comb-like structure comprising a plurality of side chains each composed of a polyester chain is preferably used. This polyamide-based dispersant having a comb-like structure comprising a plurality of side chains each composed of a polyester chain is a compound having a main chain containing a plurality of nitrogen atoms, such as a polyethyleneimine, and having a plurality of side chains bonded to the nitrogen atoms via amide linkages, wherein the side chains are polyester chains. Examples include dispersants with a structure having a main chain composed of a polyalkyleneimine such as polyethyleneimine, to which 3 to 80 poly(carbonyl-$C_3$-$C_6$-alkyleneoxy) chains are bonded as side chains via amide linkages per molecule, as disclosed in JP 05-177123 A. The above-mentioned products Solsperse 11200 and Solsperse 28000 (both product names) manufactured by Lubrizol Japan Ltd. are polyamide-based dispersants having this type of comb-shaped structure.

The amount of the pigment dispersant need only be sufficient to enable satisfactory dispersion of the above pigment within the non-aqueous solvent, and may be set as appropriate.

There are no particular limitations on the dye, and examples of dyes that may be used include azo dyes, metal complex dyes, naphthol dyes, anthraquinone dyes, indigo dyes, carbonium dyes, quinoneimine dyes, xanthene dyes, cyanine dyes, guillotine dyes, nitro dyes, nitroso dyes, benzoquinone dyes, naphthoquinone dyes, phthalocyanine dyes and metal phthalocyanine dyes. These dyes may be used individually, or may be combined as appropriate.

The amount of the de within the ink is preferably within a range from 0.1 to 20% by mass, and more preferably from 1 to 10% by mass, relative to the total mass of the ink.

The term "non-aqueous solvent" refers to non-polar organic solvents and polar organic solvents for which the 50% distillation point is at least 150° C. The 50% distillation point is measured in accordance with JIS K0066 "Test Methods for Distillation of Chemical Products" and represents the temperature at which 50% by mass of the solvent has volatilized. From the viewpoint of safety, the 50% distillation point of the non-aqueous solvent is preferably 160° C. or higher, and more preferably 230° C. or higher.

In the present embodiment, a non-polar organic solvent and a polar organic solvent are preferably used in combination. A solvent composed of 20 to 80% by mass of a non-polar solvent and 80 to 20% by mass of a polar solvent is preferred, and a solvent composed of 30 to 70% by mass of a non-polar solvent and 70 to 30% by mass of a polar solvent is particularly desirable.

Examples of preferred non-polar organic solvents include petroleum-based solvents such as aliphatic hydrocarbon solvents, alicyclic hydrocarbon solvents and aromatic hydrocarbon solvents, and mineral oils such as liquid paraffin, spindle oil, light oil, kerosene, machine oil, lubricant oil and synthetic oil. Specific examples of preferred aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by JX Nippon Oil & Energy Corporation; Isopar G, Isopar H. Isopar L, Isopar M, Exxsol D40, Exxsol D80, Exxsol D100, Exxsol D130 and Exxsol D140, all manufactured by Exxon Mobil Corporation; and Normal Paraffin H manufactured by Japan Energy Corporation. Specific examples of preferred aromatic hydrocarbon solvents include Nisseki Cleansol (alkylbenzene) manufactured by JX Nippon Oil & Energy Corporation and Solvesso 200 manufactured by Exxon Mobil Corporation.

Examples of solvents that can be used as the polar organic solvent include ester-based solvents, alcohol-based solvents, higher fatty acid-based solvents, ether-based solvents, and mixed solvents thereof. For example, one or more solvents selected from the group consisting of ester-based solvents composed of an ester of a higher fatty acid of 8 to 20 carbon atoms and art alcohol of 1 to 24 carbon atoms, higher alcohols of 8 to 24 carbon atoms, and higher fatty acids of 8 to 20 carbon atoms can be used favorably.

Specific examples of preferred polar organic solvents include ester-based solvents such as methyl latrine, isopropyl laurate, isopropyl myristate, isooctyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol, oleyl alcohol, hexyldecanol, octyldodecanol and decyltetradecanol; higher fatty acid-based solvents such as nonanoic acid, isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

These non-aqueous solvents may be used individually, or two or more solvents may be used in combination.

Among the non-aqueous solvents mentioned above, the non-aqueous ink of the present embodiment preferably contains a fatty acid ester and/or a mineral oil, and the combined amount of such fatty acid esters and mineral oils preferably represents at least 50% by mass, and more preferably 75% by mass or more, of the total mass of the non-aqueous solvent contained within the non-aqueous ink.

Appropriate amounts of nozzle blockage prevention agents, antioxidants, conductivity modifiers, viscosity modifiers, surface tension modifiers, oxygen absorbers, fixing agents, preservatives, and surfactants and the like may also be added to the non-aqueous ink, of the present embodiment, provided such addition does not impair the effects of the present invention. There are no particular restrictions on the types of these additives, and those materials typically used within this field may be used.

The non-aqueous ink of the present embodiment can be obtained by adding all of the components including the coloring material and the non-aqueous solvent to a dispersion device such as a beads mill, either in a single batch or in portions, stirring and mixing the components, and if desired, filtering the resulting mixture through a membrane filter or the like. For example, the non-aqueous ink can be prepared by first uniformly mixing a portion of the non-aqueous solvent with the total mass of the coloring material to prepare a mixed liquid, dispersing this mixed liquid in a dispersion device, subsequently adding the remaining components to the resulting dispersion, and then passing the resulting ink through a filter.

There are no particular restrictions on the printing method that uses the non-aqueous ink, and priming may be conducted using an inkjet recording apparatus. The inkjet primer may employ any of various printing systems, including a piezo system, electrostatic system or thermal system. In those cases where an inkjet recording apparatus is used, the ink according to the present embodiment is preferably discharged from the inkjet head based on a digital signal, and the discharged ink droplets are then adhered to a sheet. Printing may also be performed using, a screen printing method or offset priming method.

In those cases where the non-aqueous ink is used as an inkjet recording non-aqueous ink, the ideal range for the viscosity of the ink varies depending on factors such as the diameter of the nozzles within the discharge head and the discharge environment, but at 23° C., is preferably within a range from 5 to 30 mPa·s, more preferably from 5 to 15 mPa·s, and most preferably approximately 10 mPa·s. Here, the term "viscosity" describes a value measured at 23° C. by raising the shear stress from 0 Pa at a rate of 0.1 Pa/s, and refers to the measured value at 10 Pa.

There are no particular limitations on the recording medium, and examples of media that may be used include plain paper, high-quality plain paper, inkjet (IJ) paper, IJ matte paper, coated paper in which the recording medium has been coated with an ink-absorbing solution, fine coated paper in which the ink-absorbing layer is thinner than that of a coated paper, glossy paper (photo glossy paper), special paper, and fabric.

A transport member according to an embodiment of the present invention is used for transporting a recording medium on which an image has been printed with an ink having a total surface free energy $\gamma$ calculated from the Kaelble-Uy theoretical formula of 25 to 30 mN/m, and a dispersive component ratio $\gamma dr$ represented by a formula (1) shown below of 0.55 to 0.75, wherein a portion of the transport member that opposes at least the printed surface of the recording medium has a total surface free energy $\gamma$ calculated from the Kaelble-Uy theoretical formula of 20 mN/m or less, and a dispersive component ratio $\gamma dr$ represented by the formula (1) shown below of 0.75 to 1.00.

$$\gamma dr = \gamma d/\gamma \qquad (1)$$

In the formula 1, $\gamma dr$ represents the dispersive component ratio. $\gamma d$ represents the surface free energy of the dispersive component, and $\gamma$ represents the total surface free energy.

In this embodiment, the ink and the transport member are as described above. By using this type of transport member, transfer staining by the transport member can be prevented, and the ink resistance of the transport member can be improved.

The present invention is able to provide a printing method and a transport member which prevent transfer staining by the transport member and improve the ink resistance of the transport member.

EXAMPLES

The present invention is described further below based on a series of examples, but the present invention is in no way limited by these examples.

<Preparation of Non-Aqueous Inks>

The components shown in Table 1 were premixed in the proportions shown in Table 1, zirconia beads having a diameter ($\phi$) of 0.5 mm were then added to the mixture, and dispersion was performed for 60 minutes using a rocking mill (manufactured by Seiwa Giken Co., Ltd.). The resulting dispersion was then filtered through a membrane filter (pore diameter: 3 μm) to complete preparation of a series of non-aqueous black inks.

The components shown in Table 1 are as listed below.

Carbon black MA11: "MA-11" (product name) (carbon black), manufactured by Mitsubishi Chemical Corporation.

Solsperse 28000: "Solsperse 28000" (product name), manufactured by Lubrizol Japan Ltd.

Methyl oleate: "Exceparl M-OL" (product name), manufactured by Kao Corporation.

Isopropyl myristate: "Exceparl IPM" (product name), manufactured by Kao Corporation.

Normal Paraffin H: "Normal Paraffin H" (product name) (a hydrocarbon solvent) manufactured by JX Nippon Oil & Energy Corporation.

Bis-ethoxydiglycol cyclohexane dicarboxylate: "Neosolu-Aqulio" (product name), manufactured by Nippon Fine Chemical Co., Ltd.

TABLE 1

Ink formulations

| | Mass % | Ink 1 | Ink 2 | Ink 3 |
|---|---|---|---|---|
| Pigment | Carbon black MA-11 | 8 | 8 | 8 |
| Dispersant | Solsperse 28000 | 2 | 2 | 2 |
| Non-aqueous solvent | Methyl oleate | 30 | 30 | 30 |
| | Isopropyl myristate | — | 20 | 30 |
| | Normal Paraffin H | 60 | 40 | 15 |
| | Bis-ethoxydiglycol cyclohexane dicarboxylate | — | — | 15 |
| | Total | 100 | 100 | 100 |
| | Proportion of polar organic solvent in non-aqueous solvent (%) | 33 | 56 | 83 |
| | Proportion of non-polar organic solvent in non-aqueous solvent (%) | 67 | 44 | 17 |

<Transport Rollers>

Transport rollers were prepared with each of the materials shown in Table 2 formed as the surface layer portion of the roller. The dimensions of each transport roller were diameter: 20 mm×length: 50 mm, and the thickness of the surface layer of each material was 8 mm.

TABLE 2

Transport roller materials

| Transport roller material | Manufacturer | Product number |
|---|---|---|
| Silicone resin A | Kinjo Rubber Co., Ltd. | Silicone Si5406Bk |
| Urethane resin A | Kinjo Rubber Co., Ltd. | Special urethane LMY-70 |
| Urethane resin B | Kinjo Rubber Co., Ltd. | Special urethane LMY-90 |
| Urethane resin C | Kinyo Co., Ltd. | Special urethane 81X23G |
| Fluororesin | Kinjo Rubber Co., Ltd. | Fluorine FR75X |
| Urethane resin D | Kinjo Rubber Co., Ltd. | Urethane PUR77 |
| NBR | Misumi Group Inc. | NBR RONS |
| Silicone resin B | Ways Group | Silicone 40SA1-01 |

Examples and Comparative Examples

Printing was conducted using each of the above inks and each of the above transport rollers in the combinations shown in Table 3.

<Measurement of Physical Properties of Non-Aqueous Inks>

The total surface energy $\gamma x$ and the dispersive component ratio $\gamma dr$ of each non-aqueous ink were measured. The results are shown in Table 3.

Using a dynamic contact angle meter DM500 manufactured by Kyowa Interface Science Co., Ltd., the surface tension (total surface free energy) $\gamma x$ of the non-aqueous ink and the interfacial tension $\gamma wx$ of the non-aqueous ink-water were measured using the pendant drop method. Based on the results of the measured surface tension $\gamma x$ and the interfacial tension $\gamma wx$, the total surface free energy $\gamma x$ and the dispersive component ratio $\gamma xdr$ were calculated for the ink. In other words, by inserting the values for the interfacial tension $\gamma wx$, the surface tension of water $\gamma w$ (72.8), the ink surface tension $\gamma x$, the dispersive component of water $\gamma wd$ (21.8) and the polar component of water $\gamma wp$ (51.0) into a formula a1 shown below, inserting the value for the ink surface tension $\gamma x$ into a formula a2 shown below, and then solving the two simultaneous equations, the values for the dispersive component $\gamma xd$ and the polar component. $\gamma xp$ for the ink were determined, and the ink dispersive component ratio $\gamma xdr$ was then calculated from a formula 3a shown below.

$$\gamma wx = \gamma w + \gamma x - 2\sqrt{\gamma wd \gamma xd} - 2\sqrt{\gamma wp \gamma xp} \quad (a1)$$

$$\gamma x = \gamma xd + \gamma xp \quad (a2)$$

$$\gamma xdr = \gamma xd / \gamma x \quad (a3)$$

<Measurement of Physical Properties of Transport Rollers>

The total surface energy $\gamma s$ and the dispersive component ratio $\gamma sdr$ of each transport member were measured. The results are shown in Table 3.

Using a dynamic contact angle meter DM500 manufactured by Kyowa interface Science Co., Ltd., the contact angle $\theta 1$ between the transport roller and diiodomethane, and the contact angle $\theta 2$ between the transport roller and water were each measured using the drop method, and based on the results of the measured contact angles $\theta$, the total surface free energy $\gamma s$ and the dispersive component ratio $\gamma sdr$ were calculated for the transport roller. In other words, by inserting the values for the contact angle $\theta 1$, and the total surface free energy (50.8), the dispersive component (48.5) and the polar component (2.3) for diiodomethane into a formula b1 shown below, also inserting the values for the contact angle $\theta 2$, and the total surface free energy (72.8), the dispersive component, (21.8) and the polar component (51.0) for water into a formula b1 shown below, and then solving the two simultaneous equations, the values for the dispersive component $\gamma sd$ and the polar component $\gamma sp$ for the transport roller were determined, and then the total surface free energy $\gamma s$ for the transport roller was calculated from a formula b2 shown below, and the dispersive component ratio $\gamma sdr$ for the transport roller was calculated from a formula b3 shown below.

$$\gamma l(1+\cos \theta) = 2\sqrt{\gamma sd \gamma ld} + 2\sqrt{\gamma sp \gamma lp} \quad (b1)$$

$$\gamma s = \gamma sd + \gamma sp \quad (b2)$$

$$\gamma sdr = \gamma sd / \gamma s \quad (b3)$$

<Measurement of Contact Angles Between Non-Aqueous Inks and Transport Rollers>

Using a dynamic contact angle meter DM500 manufactured by Kyowa interface Science Co., Ltd., the contact angle (°) between the non-aqueous ink and the transport roller was measured for each example. The results are shown in Table 3.

(Evaluations)

The level of roller transfer staining for each printed item and the ink resistance of each transport roller were evaluated. The results of these evaluations are shown in Table 3.

<Roller Transfer Staining>

Each of the transport rollers described above was installed within the transport path of an inkjet printer "Orphis X9050" (product name, manufactured by Riso Kagaku Corporation), in a position where the roller opposed and made contact with the printed surface of the recording medium at a position downstream from the inkjet head in the recording medium transport direction. The non-aqueous ink described above was introduced into the discharge path of the inkjet printer, and using a plain paper "Riso lightweight paper" (product name, manufactured by Riso Kagaku Corporation), a solid image was printed onto the recording medium by discharging the non-aqueous ink. The printing was performed at a resolution of 300×300 dpi, under conditions including an ink volume of 42 pl/dot. 100 sheets were printed consecutively, and the 100th recording medium was evaluated visually, against the criteria listed below, for roller staining following completion of passage through the transport direction.

AA: no staining was observed
A: staining was minimal and barely noticeable
B: slight staining was noticeable
C: staining was noticeable
D: staining was severe <Ink Resistance of Transport Rollers>

Using the combinations shown in Table 3, the transport roller was immersed in the ink at room temperature for 1 month, and the changes in hardness and dimensions of the roller following immersion were measured. The hardness was measured using a type-A durometer in accordance with JIS K6253. Rollers for which the changes in the hardness and dimensions were less than 5% were evaluated as A, and all other rollers were evaluated as B.

TABLE 3

Examples and comparative examples, evaluation results

|  | Mass % | Example |  |  |  |  | Comparative example |  |  |  |  |
|---|---|---|---|---|---|---|---|---|---|---|---|
|  |  | 1 | 2 | 3 | 4 | 5 | 1 | 2 | 3 | 4 | 5 |
| Roller material | Silicone resin A | O |  |  |  | O |  |  |  |  |  |
|  | Urethane resin A |  | O |  |  |  |  |  |  | O |  |
|  | Urethane resin B |  |  | O |  |  |  |  |  |  |  |
|  | Urethane resin C |  |  |  | O |  |  |  |  |  |  |
|  | Fluororesin |  |  |  |  |  | O |  |  |  |  |
|  | Urethane resin D |  |  |  |  |  |  | O |  |  |  |
|  | NBR |  |  |  |  |  |  |  | O |  |  |
|  | Silicone resin B |  |  |  |  |  |  |  |  |  | O |
| Roller physical properties | Total surface free energy (mN/m) | 13.08 | 18.38 | 18.14 | 15.81 | 13.08 | 21.61 | 26.74 | 69.46 | 18.51 | 18.38 |
|  | Dispersive component ratio | 0.87 | 0.77 | 0.80 | 0.82 | 0.87 | 0.90 | 0.95 | 0.23 | 0.73 | 0.77 |
| Ink | Ink 1 | O | O | O | O |  | O | O | O | O |  |
|  | Ink 2 |  |  |  |  | O |  |  |  |  |  |
|  | Ink 3 |  |  |  |  |  |  |  |  |  | O |
| Ink physical properties | Total surface free energy (mN/m) | 27.30 | 27.30 | 27.30 | 27.30 | 28.30 | 27.30 | 27.30 | 27.30 | 27.30 | 28.50 |
|  | Dispersive component ratio | 0.63 | 0.63 | 0.63 | 0.63 | 0.62 | 0.63 | 0.63 | 0.63 | 0.63 | 0.34 |
| Contact angle between ink and roller (°) |  | 66 | 49 | 43 | 55 | 66 | 40 | 29 | 37 | 49 | 49 |
| Evaluation | Roller transfer staining | AA | A | A | AA | AA | C | B | D | C | B |
|  | Roller ink resistance | A | A | A | A | A | B | A | A | B | A |

As shown in Table 3, in the examples 1 to 5, the physical properties oldie roller and the ink satisfied the appropriate ranges, and it is evident that roller transfer staining was minimal, and the ink resistance of the roller was excellent, in the comparative examples 1 to 4, the physical properties of the roller were outside the appropriate range, and the affinity between the roller and the ink increased and the roller transfer staining worsened. In the comparative example 5, the physical properties of the ink were outside the appropriate range, and the affinity between the roller and the ink increased and the roller transfer staining worsened.

It is to be noted that, besides those already mentioned above, many modifications and variations of the above embodiments may be made without departing from the novel and advantageous features of the present invention. Accordingly, all such modifications and variations are intended to be included within the scope of the appended claims.

DESCRIPTION OF THE REFERENCE SYMBOLS

1: Inkjet priming apparatus
10: Paper feed unit
20: Printing unit
30: Paper ejection unit
40: Inversion unit
50: Control unit
100: Transport roller
110: Axial portion
120: Surface layer portion

The invention claimed is:

1. A printing method, comprising: printing an ink, having a total surface free energy $\gamma$ calculated from the Kaelble-Uy theoretical formula of 25 to 30 mN/m, and a dispersive component ratio $\gamma dr$ represented by a formula (1) shown below of 0.55 to 0.75, onto a recording medium, and transporting the recording medium using a transport member that opposes at least a printed surface of the printed recording medium, wherein
the transport member has a total surface free energy $\gamma$ calculated from the Kaelble-Uy theoretical formula of 20 mN/m or less, and a dispersive component ratio $\gamma dr$ represented by the formula (1) shown below of 0.75 to 1.00:

$$\gamma dr = \gamma d / \gamma \quad (1)$$

wherein $\gamma dr$ represents the dispersive component ratio, $\gamma d$ represents a surface free energy of a dispersive component, and $\gamma$ represents the total surface free energy.

2. The printing method according to claim 1, wherein the transport member has a total surface free energy $\gamma$ calculated from the Kaelble-Uy theoretical formula of 15 mN/m or less, and a dispersive component ratio $\gamma dr$ represented by the formula (1) of 0.80 to 1.00.

3. The printing method according to claim 1, wherein a contact angle between the ink and the transport member is at least 50°.

4. The printing method according to claim 1, wherein a material for as portion of the transport member that opposes the printed surface comprises a urethane resin and/or a silicone resin.

5. The printing method according to claim 1, wherein the ink comprises a fatty acid ester and/or a mineral oil.

6. A transport member used for transporting as recording medium on which an image has been printed with an ink having a total surface free energy γ calculated from the Kaelble-Uy theoretical formula of 25 to 30 mN/m, and a dispersive component ratio γdr represented by a formula (1) shown below of 0.55 to 0.75, wherein a portion of the transport member that opposes a least a printed surface of the recording medium has a total surface free energy γ calculated from the Kaelble-Uy theoretical formula of 20 mN/m or less, and a dispersive component ratio γdr represented by the formula (1) shown below of 0.75 to 1.00:

$$\gamma dr = \gamma d / \gamma \qquad (1)$$

wherein γdr represents the dispersive component ratio, γd represents a surface free energy of a dispersive component, and γ represents the total surface free energy.

\* \* \* \* \*